United States Patent [19]

Hwung et al.

[11] Patent Number: 5,473,373
[45] Date of Patent: Dec. 5, 1995

[54] DIGITAL GAMMA CORRECTION SYSTEM FOR LOW, MEDIUM AND HIGH INTENSITY VIDEO SIGNALS, WITH LINEAR AND NON-LINEAR CORRECTION

[75] Inventors: Den-Jen Hwung, Hsinchu; Jen-Chuan Wang, Hsin Chu; Der-Song Su, Hsinchu, all of Taiwan

[73] Assignee: Industrial Technology Research Institute, Hsinchu, Taiwan

[21] Appl. No.: 255,316

[22] Filed: Jun. 7, 1994

[51] Int. Cl.$^6$ .................................................. H04N 5/202
[52] U.S. Cl. ........................................... 348/254; 348/674
[58] Field of Search .................................. 348/254, 674; 358/32, 164; H04N 5/202

[56] References Cited

U.S. PATENT DOCUMENTS

5,243,426  9/1993  Murayama ............................... 348/674

Primary Examiner—James J. Groody
Assistant Examiner—Sherrie Hsia
Attorney, Agent, or Firm—Meltzer, Lippe Goldstein et al.

[57] ABSTRACT

An image capture and display system contains a three-stage digital gamma correction circuit. Three equations are used to determine the gamma correction characteristics for low intensity, medium intensity, and high intensity signal levels, respectively. Linear correction is used for low and high intensity levels, and an adjustable non-linear correction is used for medium levels. The resultant effects of the combined correction characteristics are to increase the effective Signal-to-Noise ratio for low level signals, enhance the gray level differentiation for high level signals, and heighten the contrast control for medium level signals. In addition, the contrast control is effective throughout the entire range of signal intensity levels. The image capture and display system provides a high quality visual display, with a simple, economical hardware implementation of the inventive gamma correction circuit. The resultant small size and low cost of the inventive circuit make it particularly advantageous for camcorders, still cameras, handy scanners, and other image capture devices.

14 Claims, 6 Drawing Sheets

DIGITAL GAMMA CORRECTION SYSTEM FOR LOW, MEDIUM AND HIGH INTENSITY VIDEO SIGNALS, WITH LINEAR AND NON-LINEAR CORRECTION

FIELD OF THE INVENTION

The disclosed invention comprises a digital circuit and method for gamma correcting video signals, as used in camcorders and similar image capture devices.

BACKGROUND OF THE INVENTION

Figure 1:
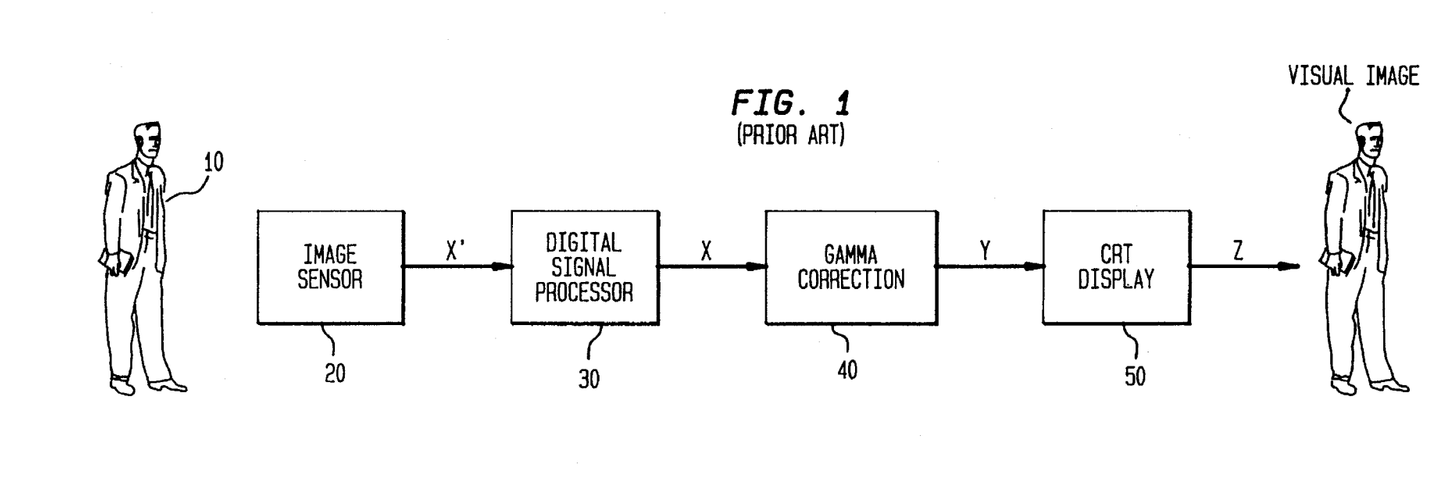
FIG. 1 is a block diagram of a typical image capture and display system.

The general process of image capture and display is illustrated in simplified form in FIG. 1. Light from the original image 10 is received by the image sensor 20 (usually a charge coupled device, or CCD) and converted into an electrical signal (X'). A digital signal processor (DSP) 30 is typically used to enhance signal X', including color correction, image enhancement, contrast control, white balance, luminance processing, and chrominance processing. The enhanced signal output (X) of DSP 30 is then gamma corrected by a gamma correction circuit 40, to provide an output (Y) which is inversely compensated for the well known non-linearity characteristic of the cathode ray tube (CRT) display monitor 50. The displayed image (Z) is a visual representation of original image 10.

Figure 2A:
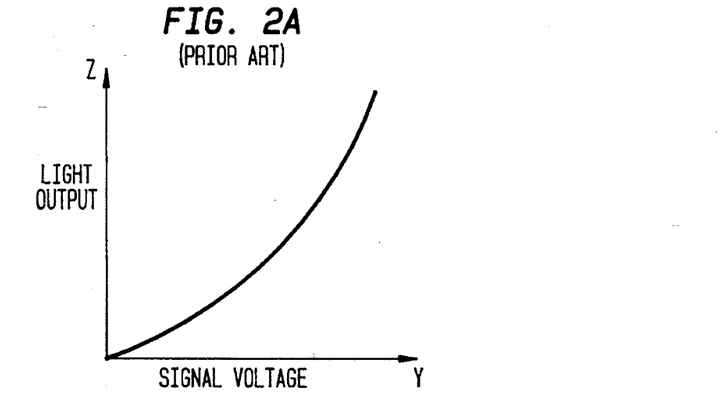
FIG. 2A is a graph of typical CRT non-linearity.

The aforementioned non-linearity characteristic of a typical cathode ray tube is depicted in FIG. 2A. The relationship between signal voltage (Y) and light output (Z) may be described as a power law, as follows:

$$Z = Q * Y^\gamma \quad \text{Equation (1)}$$

where Z is the linearized light output of the CRT, Q is a constant, Y is the gamma corrected input signal to the CRT, and $\gamma$ is a constant.

Figure 2B:
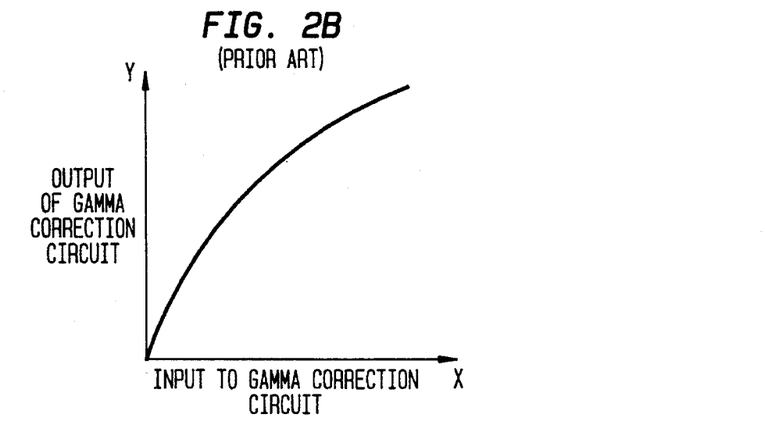
FIG. 2B is a graph of typical gamma correction.

Thus, it can be seen from Equation (1) and FIG. 2A that the light output (Z) increases more rapidly than the input signal (Y). The effect of this CRT non-linearity is to stretch out changes in luminance for the high—light intensity signals, and to compress these changes for the low-light intensity signals. To compensate for this effect, the inverse of Equation (1) has typically been applied to the CRT input signal by means of a gamma correction circuit, (e.g. circuit 40 of FIG. 1) as indicated in FIG. 2B, and in Equation (2), as follows:

$$Y = k * X^{1/\gamma} \quad \text{Equation (2)}$$

where Y is the output of the gamma correction circuit, k is a constant, X is the input to the gamma correction circuit, and $1/\gamma$ represents the gamma correction factor. A typical value for gamma is known to be 2.2, so that the gamma correction factor ($1/\gamma$) becomes 0.45.

Figure 2C:
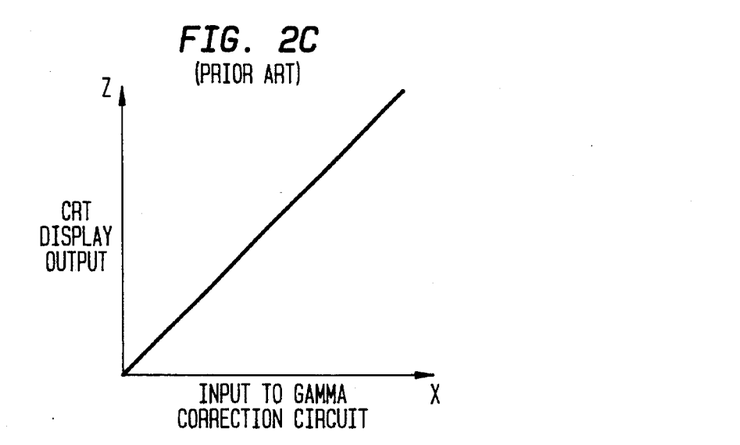
FIG. 2C is a graph of idealized gamma corrected CRT output.

The combined effect of gamma correction and CRT non-linearity results in a linearized system, as indicated in FIG. 2C, and in Equation (3), as follows:

$$Z = k * X \quad \text{Equation (3)}$$

where Z is the linearized light output of the CRT, k is a constant, and X is the input to the gamma correction circuit.

While the above described gamma correction technique can compensate for CRT non-linearity, it is not adequate for correcting other image capture and display problems. These problems include non-linearities in the image sensor (20 of FIG. 1), the DSP (30 of FIG. 1), and the light sensitivity of the human eye. Therefore, to provide the most accurate visual display possible, a more comprehensive type of gamma correction is required.

In the prior art U.S. Pat. No. 4,786,968, entitled "Gamma Correction of Digital Video Data by Calculating Linearly Interpolated Gamma Correction Values" (M. Kutner Nov. 22, 1988), only gamma values approximately equal to 1 were considered.

In U.S. Pat. No. 4,833,527, entitled "Luminance Signal Forming Circuit" (T. Kondo May 23, 1989), a very complex circuit was used to improve the reproducibility of low signal-to-noise ratio luminance signals.

In U.S. Pat. No. 5,087,966, entitled "Digital Gamma Correction" (V. Harradine Feb. 11, 1992), a digital technique was developed to simulate the typical analog gamma correction.

In U.S. Pat. No. 5,089,890, entitled "Gamma Correction Device" (T. Takayama Feb. 18, 1992), multiple gamma correction values were computed for application to corresponding input signal levels, requiring complex circuitry and time-consuming computations.

It is an object of the present invention to provide a simple hardware implementation of a digital gamma correction circuit which will address the full range of non-linearities in a typical image capture and display system.

It is a further object of the present invention to provide a three-stage type of gamma correction circuit, corresponding to low, medium, and high levels of signal intensity, in order to compensate for the sensitivity characteristics of the human eye, as well as for the aforementioned hardware non-linearities.

SUMMARY OF THE INVENTION

The disclosed invention comprises an image capture and display system, as shown in FIG. 1. CCD image sensor 20 captures the incident light from original image 10, and transforms the light intensity into electrical signals (X'). DSP 30 digitally processes these electrical signals to implement color correction, image enhancement, conventional contrast control (to be described more fully in the detailed description), and white balance, while performing luminance and chrominance processing. DSP 30 output signals (X) are then gamma corrected by gamma correction circuit 40, which includes a linear correction for low intensity signal levels, a linear correction for high intensity signal levels, and an adjustable non-linear correction for medium intensity signal levels. The gamma corrected output (Y) is converted to a visual display of original image 10 by CRT display monitor 50.

The inventive gamma correction circuit 40 is designed to select one of three operational modes, depending on the input signal intensity level. For low level signals, a linear correction is applied, in accordance with the formula:

$$Y_L = k * X_L \quad \text{Equation (4)}$$

where $Y_L$ is the low intensity gamma corrected output, k is a proportionality constant, and $X_L$ is the low intensity input to the gamma correction circuit.

For high level signals, an offset linear correction is applied, in accordance with the formula:

$$Y_h = d * k * X_h + b \quad \text{Equation (5)}$$

where $Y_h$ is the high intensity gamma corrected output, d is a slope determining value, k is a proportionality constant, $X_h$ is the high intensity input to the gamma correction circuit, and b is an offset value.

For medium level signals, an adjustable non-linear correction is applied, in accordance with the formula:

$$Y_m = G*k*X_m^{0.45} - C \qquad \text{Equation (6)}$$

where $Y_m$ is the medium intensity gamma corrected output, G is an adjustable contrast gain, k is a proportionality constant, $X_m$ is the medium intensity input to the gamma correction circuit, and C is an adjustable offset value.

The above described three-stage gamma correction equations provide the following advantages over the prior art:

a) signal-to-noise (S/N)ratio is increased for low intensity signals (Equation 4);

b) gray levels (gradations of light intensity) are enhanced for high intensity signals (Equation 5);

c) traditional gamma correction (g=0.45) is included in the inventive formula for medium intensity signals (Equation 6), while the non-linearities of conventional contrast control circuits at low and high intensity levels are also corrected.

The preferred embodiment of the inventive gamma correction circuit will be illustrated in the following detailed description, in connection with the accompanying drawings.

DETAILED DESCRIPTION OF THE INVENTION

Figure 5:
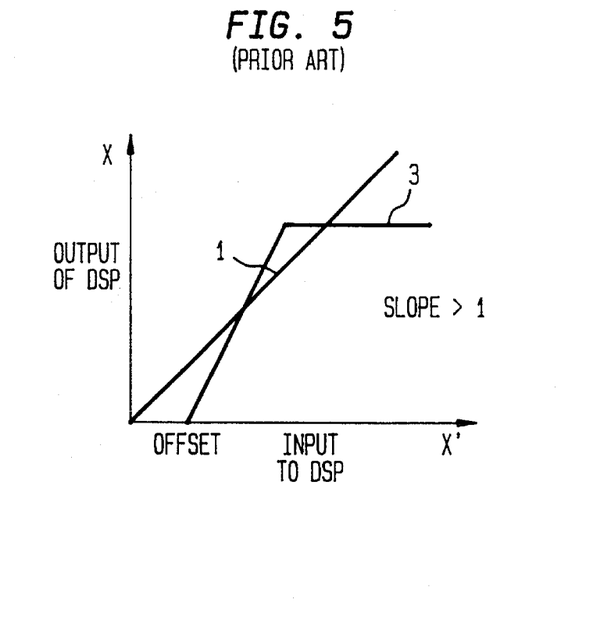
FIG. 5 is a graph of conventional contrast control non-linearities.

To review briefly, a typical image capture and display system is shown in FIG. 1. Light from original image 10 is captured by image sensor 20 (usually a CCD device), and is converted to electrical signal (X'). Conventional Digital Signal Processor (DSP) 30 performs luminance and chrominance processing to convert signal (X') to output signal (X). DSP 30 provides color correction, image enhancement, white balance, and a standard form of contrast control. This type of contrast control is illustrated in FIG. 5, where a typical contrast control characteristic curve (curve 3) is superimposed on an idealized original DSP response curve (curve 1). As indicated in FIG. 5, the typical contrast control limits the DSP output response at both the low and high signal level regions of the DSP response characteristic. When processed through typical gamma correction circuits and conventional CRT display monitors, this contrast control limitation causes non-linear effects in the displayed image, which are called "overflow" and "underflow" (see FIG. 7).

Referring again to FIG. 1, signal (X) is now processed through gamma correction device 40 and outputted as signal (Y). Finally, CRT display monitor 50 transforms signal (Y) into visual image Z, which is a likeness of original image 10.

In a typical gamma correction circuit, the exponent 0.45 is applied to signal (X) to compensate for the CRT non-linearity characteristic, which is normally equivalent to the exponent 2.2 (reciprocal of 0.45). This compensation process is shown graphically in FIGS. 2A, 2B, and 2C, where FIG. 2A depicts the CRT non-linearity characteristic, FIG. 2B depicts the gamma correction, and FIG. 2C depicts the idealized resultant linear output.

Figure 3:
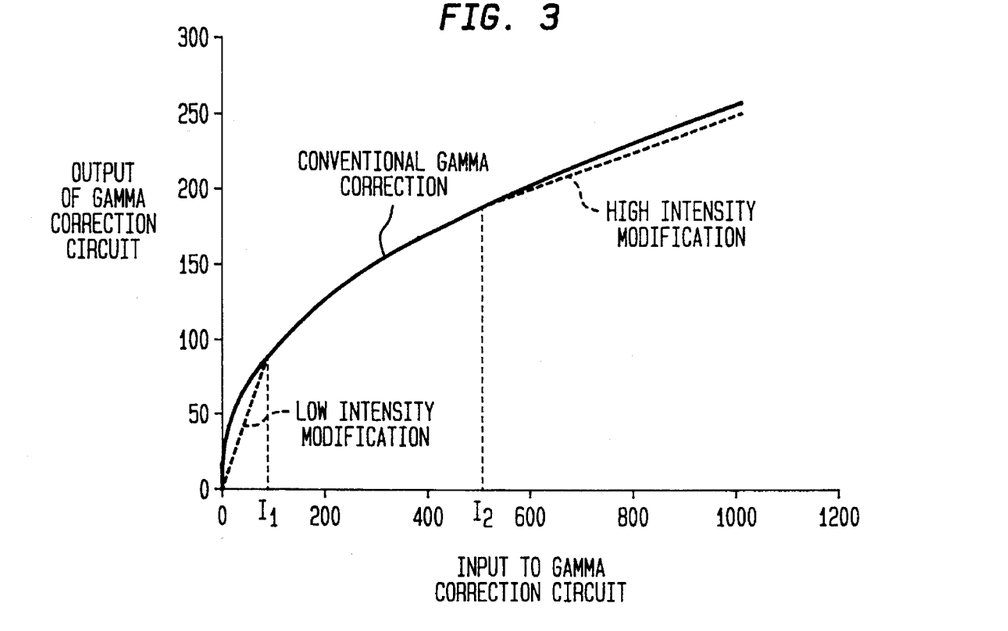
FIG. 3 is a graph depicting the inventive gamma corrections for low and high intensity signals.

The first aspect of the disclosed invention is a modification of the above described gamma correction curve for low intensity signal levels. As illustrated in FIG. 3, the original gamma correction characteristic (Equation 2) is replaced by the following linear equation for the range of X values between 0 and a pre-determined low level threshold ($I_1$):

$$Y_L = k*X_L \qquad \text{(Equation 4)}$$

where $Y_L$ represents the low intensity level gamma corrected output signal, k is a proportionality constant, and $X_L$ is the low intensity input signal to the gamma correction circuit.

The second aspect of the disclosed invention is a modification of the original gamma correction characteristic (Equation 2) for the range of X values above a pre-determined high level threshold ($I_2$), as follows:

$$Y_h = d*k*X_h + b \qquad \text{(Equation 5)}$$

where Y represents the high intensity level gamma corrected output signal, d is a slope determining value, k is a proportionality constant, $X_h$ is the high intensity input signal to the gamma correction circuit, and b is an offset value.

The effect of these first two aspects of the disclosed invention are depicted in FIG. 3 by the dashed line segments of the gamma correction curve, labeled "low intensity modification" and "high intensity modification", respectively. For the intermediate range of X values between $I_1$ and $I_2$, the original gamma correction characteristic (Equation 2) is shown as a solid line.

Figure 4:
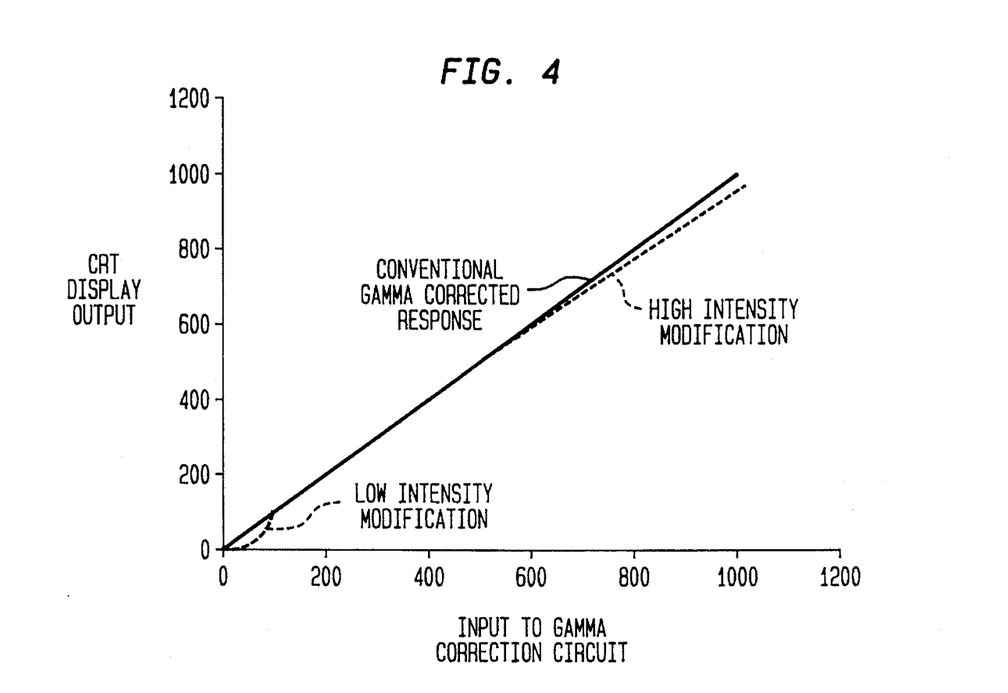
FIG. 4 is a graph depicting CRT output function with the inventive gamma corrections for low and high intensity signals.

When the inventive gamma corrections for low intensity signals (Equation 4), high intensity signals (Equation 5), and the standard gamma correction (Equation 2) for medium intensity signals are combined with the non-linear characteristic of a CRT display, the resultant response curve is as shown in FIG. 4. Here, the solid line represents the idealized conventional gamma corrected response, while the dashed line portions show the effect of the inventive modifications for low intensity and high intensity signal levels. That is, the system responses are compressed for both low and high intensity signal levels.

Compressing the low signal range helps to compensate for the inherently low S/N (signal/noise) ratio of low light intensity signals. Due to the high sensitivity of the human eye to low light intensity, the effect of low S/N ratio is to cause a "salt and pepper" effect in the visual image.

The inventive modification for low intensity signals (Equation 4) improves the effective S/N ratio, thus presenting a higher quality image to the human eye.

Compressing the high signal range helps to compensate for the "white field" effect of high intensity signals. That is, in the presence of high light intensity, the human eye is less sensitive to delineations of the displayed image, which tends to become a white field. With the inventive modification for high intensity signals (Equation 5), the compressed signals enable the viewer to better distinguish gray levels, again improving the image quality.

Figure 7:
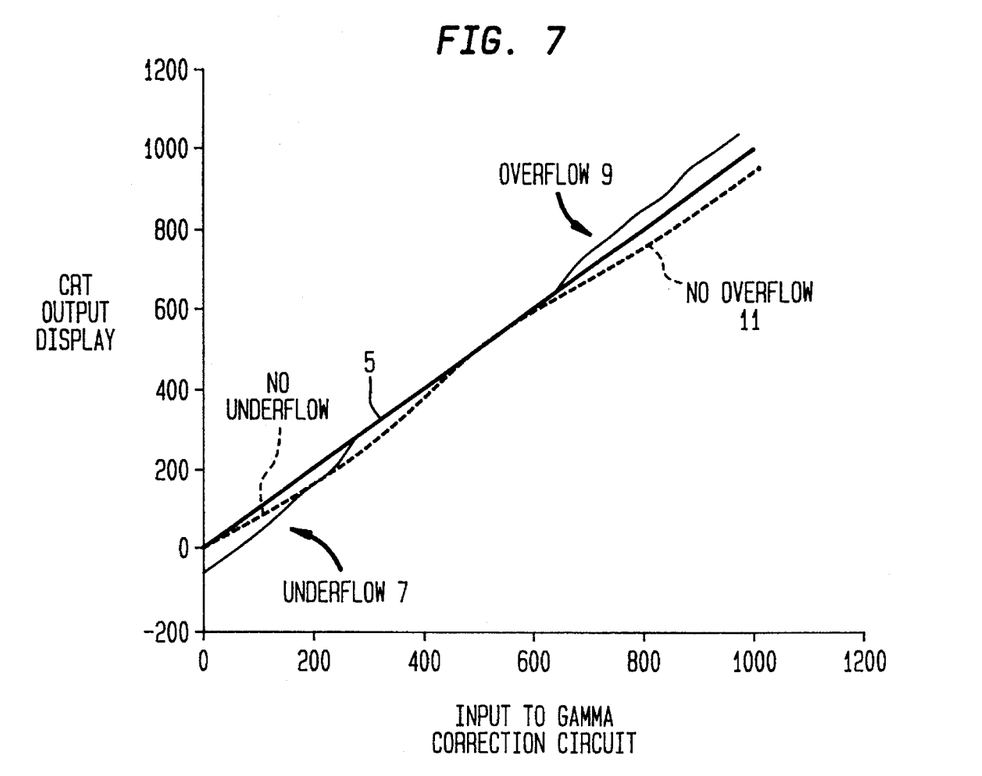
FIG. 7 is a graph depicting CRT output function with the inventive gamma corrections for low, medium, and high intensity signals.

The third aspect of the disclosed invention is a modification of the medium range of signal intensities, in accordance with the following formula:

$$Y_m = G * k * X_m^{0.45} - C \qquad \text{(Equation 6)}$$

where $Y_m$ represents the gamma corrected medium intensity output signal, G is an adjustable contrast gain, k is a proportionality constant, $X_m$ is the medium intensity signal input to the inventive gamma correction circuit, and C is an adjustable offset value. In Equation 6, the traditional gamma correction formula of Equation 2 is enhanced by the addition of gain G and offset C. This modification has the effect of increasing the contrast (difference between background and foreground) throughout the medium range of signal intensities. At the same time, this modification compensates for the underflow and overflow problem (to be described below in conjunction with FIG. 7) created by the conventional contrast control characteristic shown in FIG. 5.

Figure 6:
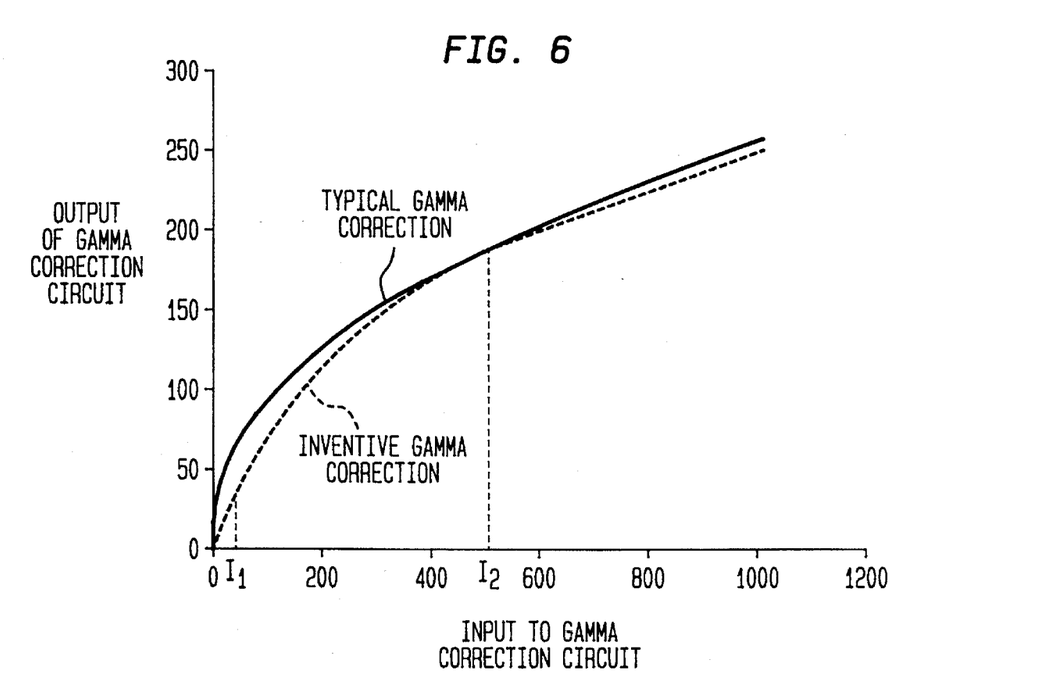
FIG. 6 is a graph depicting the inventive gamma corrections for low, medium, and high intensity signals.

The gamma correction characteristic curve combining the first, second, and third aspects of the present invention is depicted in FIG. 6. The solid line in FIG. 6 represents the traditional gamma correction of Equation 2. The dashed line in FIG. 6 represents the composite inventive gamma correction curve, encompassing Equation 4 (low intensity), Equation 5 (high intensity), and Equation 6 (medium intensity).

This inventive gamma correction curve is transformed by a typical CRT non-linearity characteristic as shown in FIG. 7. The straight solid line (curve 5) represents an idealized conventional gamma corrected CRT response. The solid curved lines (7,9) represent the effects of standard contrast control underflow and overflow on the conventional gamma corrected CRT response. The dashed curve (curve 11) represents the composite inventive gamma correction characteristic as transformed by a CRT display. In addition to the signal compression at low and high levels as previously described, the inventive correction also compensates for the underflow and overflow limitations of conventional contrast control circuits.

Thus, the three aspects of the disclosed invention (Equations 4, 5, and 6) can improve the visual quality of an image capture and display system for low, medium, and high intensity signal ranges, and also provide an adjustable contrast control throughout the entire range of signal intensities.

Figure 8:
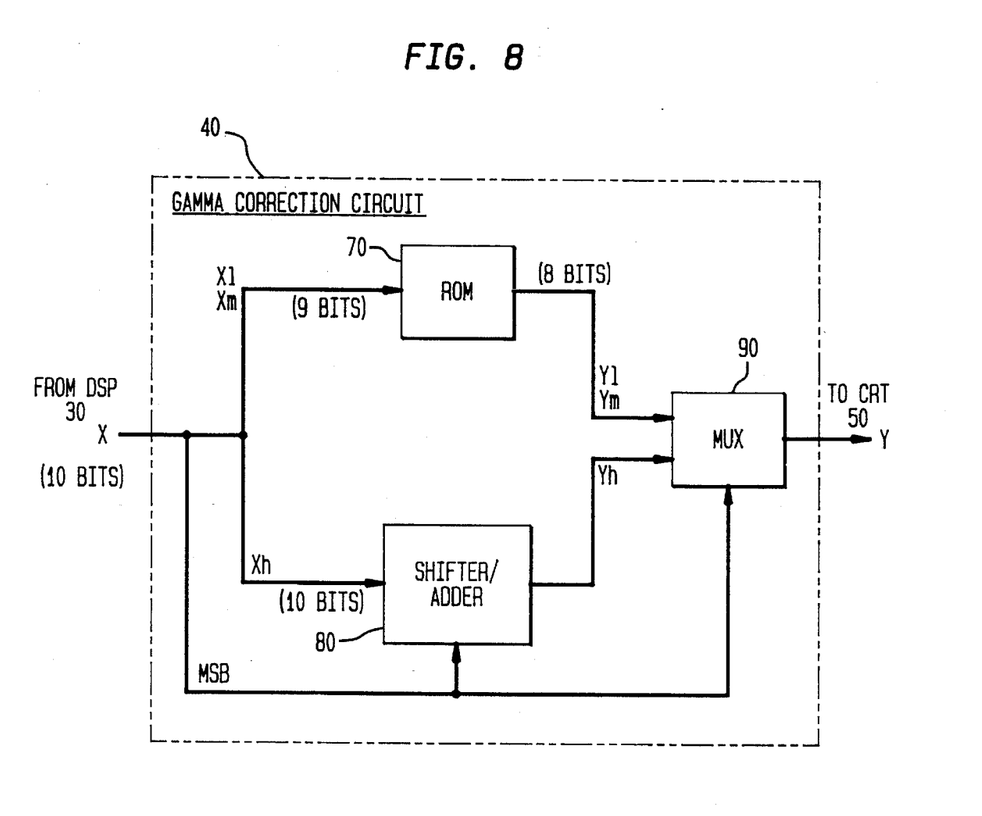
FIG. 8 is a block diagram of the inventive gamma correction circuit.

The preferred embodiment of the circuit for implementing the disclosed gamma correction equations is shown in block diagram form in FIG. 8. This circuit represents gamma correction block 40 in FIG. 1 when implemented according to the invention.

A 10-bit input signal (X) is received from DSP 30 (FIG. 1) and is applied to a ROM look-up table 70 or shifter/adder 80 (FIG. 8), as determined by the signal X intensity level. That is, low and medium intensity level signals are routed to ROM 70, while high intensity level signals are routed to shifter/adder 80. As stated previously, low level signals are values of X below a pre-determined level $I_1$, medium level signals are values of X between $I_1$ and pre-determined level $I_2$, and high level signals are values of X greater than $I_2$. Illustratively, $I_1=16$ and $I_2=512$.

For a 10-bit low level signal ($X_L$), ROM 70 performs the function of Equation 4, providing an 8-bit output signal ($Y_L$)=k*$X_L$ to multiplexer (MUX) 90. Symbol k represents a proportionality constant, which normalizes the 8-bit output ($Y_L$) to the 10-bit input ($X_L$).

For a 10-bit medium level signal ($X_m$), ROM 70 performs the function of Equation 6, providing an 8-bit output signal ($Y_m$)=G * k*$X^{0.45}_m$ –C to MUX 90. Symbol G represents an adjustable contrast gain, and symbol C represents an adjustable offset value.

For a 10-bit high level signal ($X_h$), shifter/adder 80 performs the function of Equation 5, providing an 8-bit output signal $Y_h$=d * k*$X_h$+b to MUX 90. Symbol d represents the slope of the high level correction, and is equal to $(½)^p$ where p is a positive integer (1,2,3, . . . ). Symbol b represents an adjustable offset value.

In the above described embodiment, ROM 70 has a capacity of 512 words for implementing Equations 4 and 6. Shifter/adder 80 provides values of d which are typically equal to ⅛, 1/16, 1/32. . , depending on the application. The values of contrast gain G, offset C, and offset b are adjustable, as determined by the particular circuit requirements. Illustratively, G=1, C=23, b=100 and k=11.3.

The output signal (Y) of gamma correction circuit 40 is selected by MUX 90 in accordance with the MSB bit of input signal X. This MSB bit also controls the routing of the low, medium, and high intensity levels of input signal X. When MSB=0, the lower 9 bits are routed to ROM look-up table 70 for low and medium level signals; when MSB=1, all 10 bits are routed to shifter/adder 80 for high level signals.

Referring again to FIG. 1, output signal Y is applied to CRT display 50, which transforms signal Y into a visual image (Z).

In summary, the above described inventive gamma correction circuit provides an integrated three-part correction characteristic, as defined by Equations 4, 5, and 6. The inventive correction characteristic, when combined with the non-linearity of a typical CRT display, results in a high quality visual image with full contrast control over the entire input signal range. Moreover, the inventive gamma correction circuit is simple and economical to implement, as compared to the prior art. Thus, it is applicable to many types of image capture devices, such as camcorders, still cameras, and handy scanners.

While a preferred embodiment of the disclosed invention has been described herein, it is to be understood that the invention is not limited to this precise embodiment, and that various changes and modifications may be effected therein by one skilled in the art without departing from the spirit or scope of the invention as defined in the following claims.

We claim:

1. An image capture and display apparatus with variable digital gamma correction, comprising:

an image sensor configured to transform an incident light intensity from an input image signal into electrical signals;

a signal processor connected to receive said electrical signals from said image sensor and to output processed electrical signals;

a digital gamma correction device connected to receive said processed electrical signals from said signal processor;

said digital gamma correction device configured to receive linear correction to low intensity levels of said processed electrical signals to produce low intensity level gamma corrected signals;

said digital gamma correction device configured to apply linear correction to high intensity levels of said processed electrical signals to produce high intensity level gamma corrected signals;

said digital gamma correction device configured to apply adjustable non-linear correction to medium intensity levels of said processed electrical signals to produce medium intensity level gamma corrected signals;

a display monitor configured to transform said low intensity, said high intensity, and said medium intensity level gamma corrected signals from said digital gamma correction device;

said display monitor configured to transform said low, said high, and said medium intensity level gamma corrected signals into a visual display of said input image signal.

2. The apparatus of claim 1, wherein the gamma correction device is configured so that said low intensity level signals are gamma corrected in accordance with a formula:

$$Y_l = k*X_l$$

where $Y_l$ is the low intensity level gamma corrected output signals of said gamma correction device, k is a proportionality constant, and $X_l$ is the low intensity level signals input to said gamma correction device.

3. The apparatus of claim 1, wherein the gamma correction device is configured so that said high intensity level signals are gamma corrected in accordance with a formula:

$$Y_h = d*k*X_h + b$$

where $Y_h$ is the high intensity level gamma corrected output signals of said gamma correction device, d is a slope determining value, k is a proportionality constant, $X_h$ is the high intensity level signals input to said gamma correction device, and b is an offset value.

4. The apparatus of claim 1, wherein the gamma correction device is configured so that said medium intensity level signals are gamma corrected in accordance with a formula:

$$Y_m = G*k*X_m^{0.45} - C$$

where $Y_m$ is the medium intensity level gamma corrected output signals of said gamma correction device, G is an adjustable contrast gain, k is a proportionality constant, $X_m$ is the medium intensity level signals input to said gamma correction device, and C is an adjustable offset value.

5. The apparatus of claim 2, wherein said gamma correction device comprises a ROM look-up table for determining values of said $Y_l$ signals.

6. The apparatus of claim 3, wherein said gamma correction device comprises a shifter and adder circuit for determining values of said $Y_h$ signals.

7. The apparatus of claim 4, wherein said gamma correction device comprises a ROM look-up table for determining values of said $Y_m$ signals.

8. A method of capturing and displaying an image, comprising the steps of:

transforming incident light from an input image signal into electrical signals;

gamma correcting said electrical signals to apply a linear correction to low intensity levels of said electrical signals to produce low intensity level gamma corrected signals;

gamma correcting said electrical signals to apply a linear correction to high intensity levels of said electrical signals to produce high intensity level gamma corrected signals;

gamma correcting said electrical signals to apply an adjustable non-linear correction to medium intensity levels of said electrical signals to produce medium intensity level gamma corrected signals; and transforming said low intensity, said high intensity, and said medium intensity level gamma corrected signals into a visual display of said input image signal.

9. The method of claim 8, wherein said low intensity level signals are gamma corrected in accordance with a formula:

$$Y_l = k*X_l$$

where $Y_l$ is said low intensity level gamma corrected signals, k is a proportionality constant, and $X_l$ is the electrical signals having a low intensity level.

10. The method of claim 8, wherein said high intensity level signals are gamma corrected in accordance with a formula:

$$Y_h = d*k*X_h + b$$

where $Y_h$ is said high intensity level gamma corrected signals, d is a slope determining value, k is a proportionality constant, $X_h$ is the electrical signals having a high intensity level, and b is an offset value.

11. The method of claim 8, wherein said medium intensity level signals are gamma corrected in accordance with a formula:

$$Y_m = G*k*X_m^{0.45} - C$$

where $Y_m$ is said medium intensity level gamma corrected signals, G is an adjustable contrast gain, k is a proportionality constant, $X_m$ is the electrical signals having a medium intensity level, and C is an adjustable offset value.

12. The method of claim 8, wherein contrast is maintained over the entire range of said electrical signals having said low, said high, and said medium intensity levels.

13. A method for gamma correcting an electrical signal, comprising the steps of:

(a) receiving the electrical signal having low, medium, and high intensity level ranges;

(b) receiving the low intensity level signal and applying a linear gamma correction to said low intensity level signal; (c) receiving the medium intensity level signal and applying a non-linear gamma correction to said medium intensity level signal;

(d) receiving the high intensity level signal and applying a linear gamma correction to said high intensity level signal; and (e) outputting low, medium and high intensity level gamma corrected electrical signals.

14. A circuit for gamma correcting electrical signals having a low, a medium, and a high intensity range, corresponding to an image to be displayed, comprising:

(a) a first means for receiving the low intensity range electrical signals and for applying a linear gamma correction to said low intensity range signals;

(b) a second means for receiving the medium intensity range electrical signals and for applying a non-linear gamma correction to said medium intensity range signals;

(c) a third means for receiving the high intensity range signals and for applying a linear gamma correction to said high intensity range signals; and (d) an output means for outputting low, medium and high intensity range gamma corrected electrical signals.

* * * * *